E. H. DEWSON & W. V. TURNER.
ELECTROPNEUMATIC BRAKE APPARATUS.
APPLICATION FILED MAY 9, 1910.
1,092,141.
Patented Apr. 7, 1914.
3 SHEETS—SHEET 3.
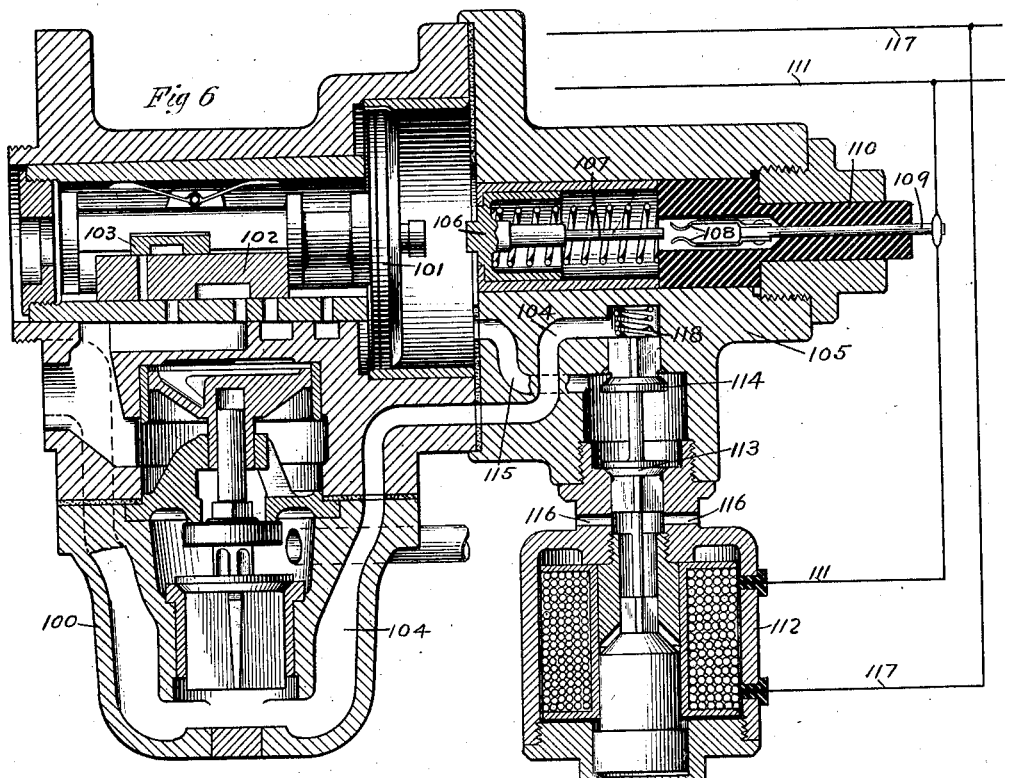
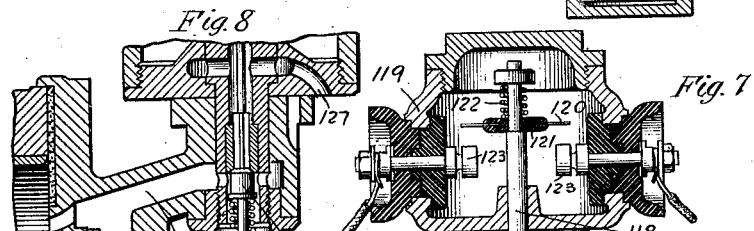
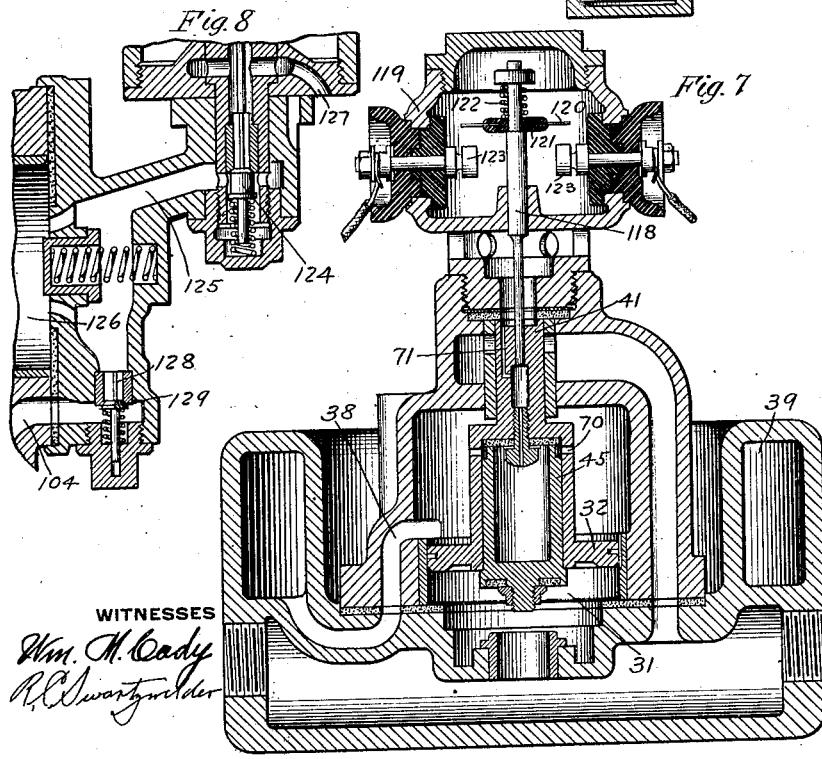
WITNESSES
INVENTORS
Edward H. Dewson
Walter V. Turner
by E. H. Wright
Att'y.

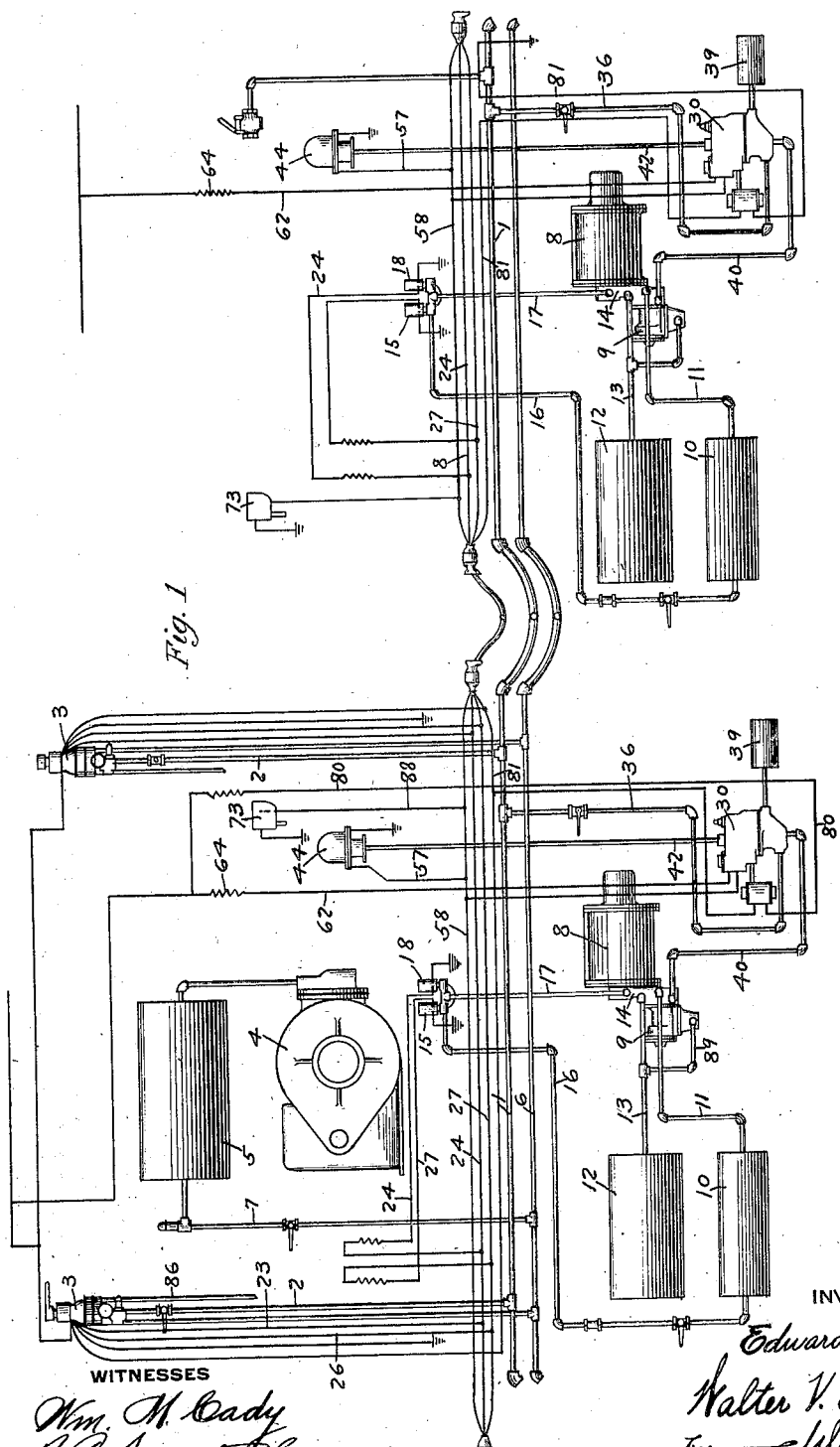

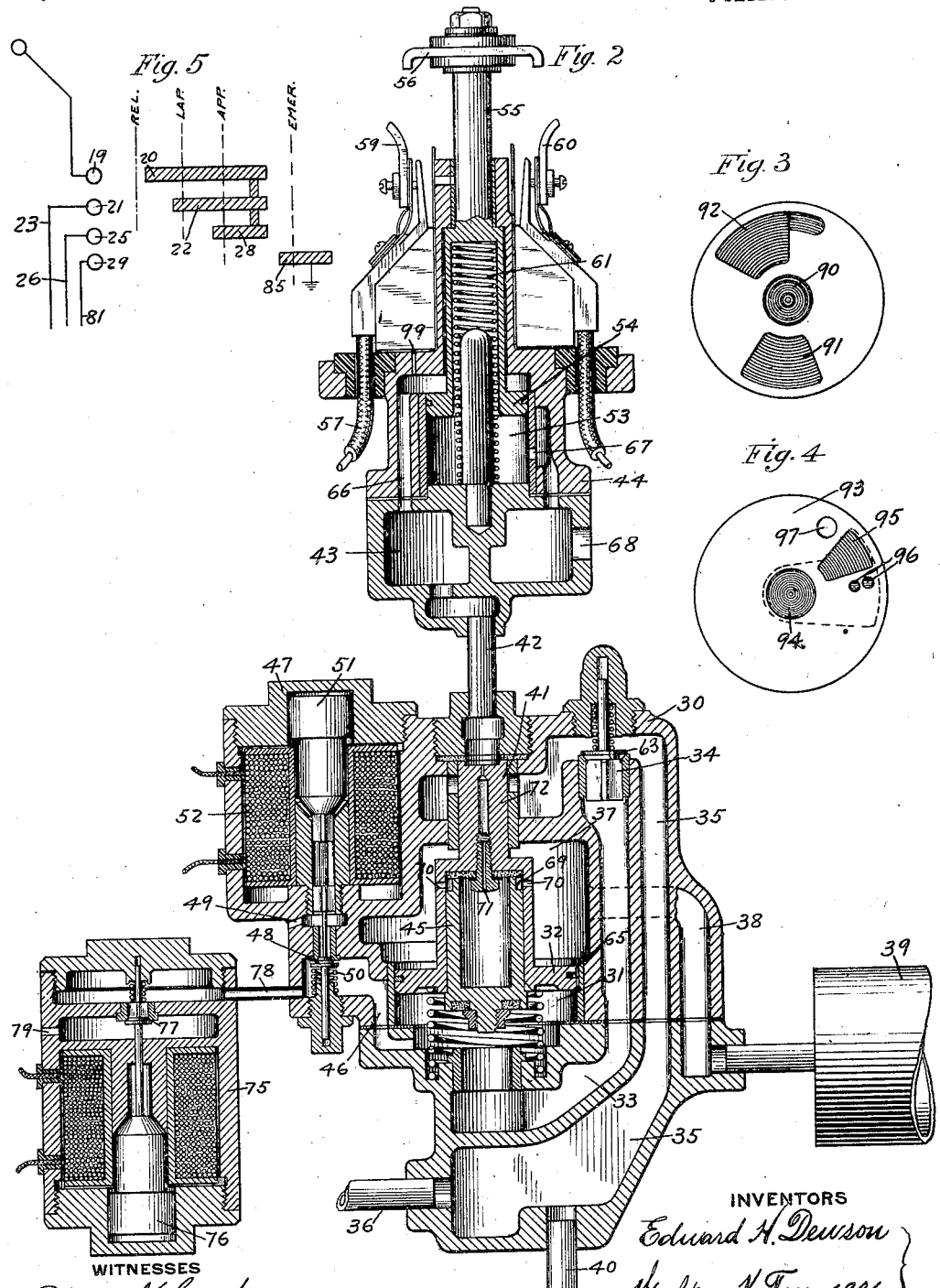

UNITED STATES PATENT OFFICE.

EDWARD H. DEWSON, OF NEW YORK, N. Y., AND WALTER V. TURNER, OF EDGEWOOD, PENNSYLVANIA, ASSIGNORS TO THE WESTINGHOUSE AIR BRAKE COMPANY, OF PITTSBURGH, PENNSYLVANIA, A CORPORATION OF PENNSYLVANIA.

ELECTROPNEUMATIC BRAKE APPARATUS.

1,092,141. Specification of Letters Patent. Patented Apr. 7, 1914.

Application filed May 9, 1910. Serial No. 560,172.

*To all whom it may concern:*

Be it known that we, EDWARD H. DEWSON and WALTER V. TURNER, citizens of the United States, residents of New York, in the county of New York and State of New York, and Edgewood, in the county of Allegheny and State of Pennsylvania, respectively, have invented a certain new and useful Improvement in Electropneumatic Brake Apparatus, of which the following is a specification.

This invention relates to fluid pressure brakes, and more particularly to an electropneumatic brake apparatus.

One object of our invention is to provide an improved electro-pneumatic brake apparatus.

Another object of our invention is to provide means adapted to be operated both electrically and pneumatically for locally venting air from the train pipe, so as to effect a simultaneous application of the brakes throughout the train.

In the accompanying drawings, Figure 1 is a diagrammatic view of an electro-pneumatic brake equipment for a motor car and trailer, with our improvements applied thereto; Fig. 2 a central sectional view of an electrically controlled vent valve device embodying our invention; Fig. 3 a plan view of the rotary valve seat of the brake valve employed in connection with the electro-pneumatic brake apparatus, showing the relative location of the ports and cavities; Fig. 4 a face view of the rotary valve of said brake valve; Fig. 5 a diagram showing the brake switch contacts developed; Fig. 6 a central sectional view illustrating a modified construction embodying our improvement; and Figs. 7 and 8 sectional views of still another modified construction embodying our invention.

In Fig. 1 of the drawings is shown an electro-pneumatic brake apparatus applied to a motor car and a trailer, which may comprise a train pipe 1 connected at each end of the motor car by a pipe 2 to a combined brake valve and brake switch 3, a compressor 4 for supplying air to a main reservoir 5, a main reservoir supply pipe 6 connected to the main reservoir 5 by a pipe 7. The apparatus also includes on both the motor car and the trailer a brake cylinder 8, triple valve device 9, auxiliary reservoir 10, having pipe 11, and supplemental reservoir 12 having pipe 13 leading to the triple valve bracket 14. For the electric brake control preferably an application magnet 15 is provided which is adapted when energized to admit air from the auxiliary reservoir 10 through pipe 16 to pipe 17, connected to the exhaust port of the triple valve 9, a release magnet 18 being also provided which is adapted when deënergized to open the pipe 17 to the atmosphere. Contacts are provided in the brake switch portion of the combined brake valve and switch 3 so that in release position the circuits are all open and both the application and the release magnets are deënergized, thus closing the supply and opening the exhaust. In electric lap position, a contact finger 19, shown in the diagram Fig. 5, and leading to a source of current, engages a segment 20 of the switch drum and a contact finger 21 is in contact with a segment 22. The contact finger 21 is connected by a wire 23 with a train wire 24 leading to one terminal of the release magnet 18. Thus in electric lap position the release magnet 18 is energized and the electric release valve is closed. In electric application position, a contact finger 25 connected to wire 26, leading to train wire 27 of the application magnet 15, is in contact with a segment 28, so that the application magnets throughout the train are energized to open the electric supply valves and admit fluid under pressure from the auxiliary reservoir 10 to the brake cylinder, the release magnets being still energized to maintain the electric exhaust valves closed. According to our invention the application and release magnets have one terminal permanently connected to ground and current is supplied from the head car to the magnets by the bus lines 24 and 27, suitable resistances being interposed in the connections to the magnets, so as to limit the current supplied thereto. By this means, the voltage on each car at the magnets is substantially uniform, regardless of the length of the train, and thus a more uniform and reliable action of the magnets is obtained. For pneumatically controlling the brakes the brake valve seat may be provided with a central port 90 connected to the train pipe branch pipe 2, an exhaust port 91 leading to the exhaust pipe 86 and a cavity 92. The rotary valve 93 of the brake valve is provided with a central port opening 94 connected by a cavity in the valve with a large port opening 95 and small port openings 96. A through port 97 is also provided in the valve. In release position, the port 95 and through port 97 register with cavity 92 so as to supply air to the train pipe at the standard pressure carried in the system. In electric application and electric lap positions, the above connection remains the same, so that the train pipe pressure may be maintained. In service application position the small ports 96 register with the exhaust cavity 91, so that fluid may be vented from the train pipe to effect a service application of the brakes, while in emergency position the larger port 95 registers with the exhaust cavity 91, so as to effect a sudden reduction in train pipe pressure and a consequent emergency application of the brakes.

As shown in Fig. 2, the electro-pneumatic vent valve device may comprise a casing 30 having a piston chamber containing a piston 32, the chamber 31 on one side of the piston being normally open to the train pipe through a passage 33 containing a check valve 34, and passage 35 leading to pipe 36, which is connected to the train pipe. The piston is subject on its opposite face to the pressure of a chamber 37 which is preferably connected through a passage 38 with a small reservoir 39, so as to increase the volume of the chamber. Triple valve branch pipe 40 opens into the passage 35 and thus communicates with the train pipe. The piston 32 carries a valve 41 adapted to control communication for venting fluid from passage 35 and the train pipe to a pipe 42 opening into a chamber 43 of a pneumatic switch casing 44. Mounted within the piston 32 is a piston 45 for controlling communication from the passage 33 to chamber 31. A passage 46 leads from the chamber 31 to an electro-magnet valve device 47 having a valve 48 adapted to control communication from the passage 46 to an atmospheric exhaust port 49. The valve 48 is normally held closed by a spring 50 and is adapted to be opened by the movement of the armature 51 of an electro-magnet 52. In the switch casing 44 is a piston chamber 53 containing a piston 54 having a piston stem 55 carrying a movable switch contact 56. One fixed switch contact 59 is connected by a wire 57 with a train wire 58, the latter wire being connected to one terminal of the vent valve magnet 52, and the other fixed contact 60 is connected to ground, so that when the switch is closed the line wire 58 and the magnets 52 are grounded. A spring 61 acts on the piston 54 to normally maintain the switch open. The other terminal of the magnet 52 is connected by a wire 62 to a source of current, such as the third rail or trolley, preferably on each car, a suitable resistance 64 being interposed in the wire. When the brake system is charged up, fluid under pressure flows through the passage 35 and a small port 63 in the check valve 34 to passage 33 and thence to chamber 31, and the piston 32 being in its outer position, air flows through a feed groove 65 around the piston, charging the chamber 37 and reservoir 39 to the normal pressure carried in the system. The circuit of the magnet 52 is normally open and the valve 48 is held closed by the spring 50, but upon closing the circuit, the armature 51 opens the valve 48 and air is vented from chamber 31 through passage 46 to exhaust port 49. The higher pressure in chamber 37 thereupon shifts the piston 32 to its inner seat opening the valve 41. Fluid from the train pipe then flows through passages 35 and 42 to chamber 43 of the switch device 44 and thence through a passage 66 to the upper side of piston 54. Said piston is thus shifted to cause the switch contact 56 to close the circuit across the terminals 59 and 60, so that the train wire 58 is grounded and all the magnets 52 are thereupon energized. In the closed position of the piston 54, a port 67 is open to the space above the piston, so that fluid from the train pipe can escape to an atmospheric exhaust port 68. Upon a predetermined reduction in train pipe pressure by venting to the exhaust port 68, the spring 61 shifts the piston 54 upwardly, opening the circuit across the terminals 59 and 60. The magnets 52 being thereupon deënergized, the valves 48 are closed, and as the piston 32 is seated, with the feed groove 65 closed, fluid pressure is bottled up in chamber 37. The pressure on the opposite side of piston 32 continues to reduce by flow from chamber 31 past check valve 34 to vent passage 42, an exhaust port 99 opening to passage 66 providing for the release of air when the port 68 is cut off, until the pressure of the chamber 37 acting on a differential area 69 of the piston 45, communication being provided to said area by way of ports 70, together with the train pipe pressure acting within the seated area of said piston 45, is sufficient to overcome the train pipe pressure acting on the outer face of piston 45, then the piston 45 moves from its upper seat, and exposing the full area thereof to the higher pressure of the chamber 37, is instantly seated downwardly, so as to cut off communication from the train pipe passage 33 to chamber 31. It will be noted that a restricted passage 71 is provided through the stem 72 of the piston 32, so that the pressure of fluid flowing from the passage 35 to the passage 42 is supplied to the chamber within the piston 45.

The piston 45 being seated downwardly, communication is opened from chamber 37 through ports 70 and the restricted port 71 to passage 42, so that the pressure in chamber 37 now reduces with the train pipe pressure, while the pressure in chamber 31 is bottled up. It will therefore be evident that as soon as the pressure in chamber 37 reduces a certain amount, the pressure in chamber 31 will exceed the pressure in chamber 37 and the piston 32 will thereupon be shifted upwardly to close the valve 41, and cut off the further flow of air from the train pipe. The pressure in the chamber within piston 45 then rapidly drops to atmospheric pressure by flow to the passage 42 and exhaust port 99, and the pressure acting on the lower exposed face of the piston 45 thereupon shifts the piston to its upper seat. It will now be evident that the vent valve device operates to effect a predetermined reduction in train pipe pressure, the reduction depending upon the relative proportioning of the parts, so that all the triple valves in the train are caused to operate practically simultaneously to produce an emergency application of the brakes.

One of the important features of our invention is that the simultaneous action of all the vent valves in the train may be effected by the action of any one vent valve pneumatically, as by a sudden reduction in train pipe pressure initiated at some point in the train, for example upon a break-in-two, or upon making an emergency reduction in train pipe pressure at the head end of the train by means of the brake valve, the venting of fluid under pressure from chamber 31 being then through passages 33 and 35. The operation of a single vent valve anywhere in the train closes a corresponding switch 56 and thus completes the circuit for all the magnets 52 in the train so that all vent valves are caused to operate. The circuit of the magnets 52 may be closed in various ways, as by means of a conductor's switch 73 on the car, adapted to connect the line wire 58 to ground, or by providing a contact in the brake switch adapted in emergency position to connect the wire 58 to ground. As an additional safeguard, means may be provided in some cases, whereby the vent valve is operated by the breaking of a normally closed circuit, for example, a magnet 75 having an armature 76 for controlling a valve 77 may have a pipe connection 78 to the passage 46, the opening of the valve 77 being adapted to vent air from passage 46 and chamber 31 to an exhaust port 79. The circuit for magnet 75 is preferably arranged with a wire 80 on the head car connected to a source of current and one terminal of the magnet 75 and a wire 81 connected to the other terminal and extending through the train and including the magnets 75 on the other cars of the train. On the last car the wire 81 is connected to the ground. It is thus seen that the magnets 75 are maintained normally energized and the valves 77 are kept closed by the armatures 76. If the wire 81 is broken from any cause, or if there is a failure of current, the magnets 75 are operated and air is vented from the vent valve pistons 32 to effect a sudden reduction in train pipe pressure and an emergency application of the brakes.

In addition to the contacts, hereinbefore enumerated, a contact finger 29, connected to the vent valve controlling magnet wire 58, may be provided in the brake switch, which is adapted in the emergency position of the brake valve to engage a segment 85 connected to ground, so that the movement of the brake valve to emergency position operates to ground the vent valve magnets and thereby cause the simultaneous operation of all the vent valves in the train. Instead of an additional contact in the brake switch, the action of the vent valves may be initiated by connecting the usual exhaust pipe 86 of the brake valve with the chamber 43 of the vent valve switch on the head car, so that in emergency position, air exhausted from the train pipe is vented to chamber 43 and thereby the switch 56 on the head car is actuated to ground the vent valve circuit for the train and in this manner effect the simultaneous action of all the vent valves. A conductor's switch 73 may also be provided on each car having a wire 88 connected to the wire 58 and adapted upon operation to connect the wire 58 to ground so as to set the vent valves into action. If the switch 44 is connected to the exhaust pipe 86 of the brake valve, the exhaust of air from the train pipe in making service applications of the brakes is provided for by the port 99, which is made of sufficient size for that purpose. Thus the piston 54 will only be actuated when a sudden reduction in train pipe pressure is made.

Any type of triple valve may be employed in connection with our improvements but preferably we provide a triple valve of the quick action type and utilize the usual quick action parts for supplying fluid to the brake cylinder from the supplemental reservoir 12 in emergency applications. For this purpose, the usual train pipe connection to the quick action check valve chamber is closed and said chamber is connected by a pipe 89 to the supplemental reservoir pipe 13, so that, upon operation of the emergency piston in an emergency application, fluid from the supplemental reservoir is supplied to the brake cylinder.

In Fig. 6 of the drawings is illustrated a modified construction in which the electric switch device is adapted to be operated directly by the movement of the triple valve parts. As shown in the drawings, a triple valve device 100 is provided, comprising the usual triple piston 101 for operating the main slide valve 102 and auxiliary valve 103 and having a train pipe passage 104 for supplying fluid to the triple valve piston chamber. According to this form of our improvement we provide a cap 105 adapted to be applied to the triple valve device in place of the usual cap. The cap 105 contains a graduating stem 106 carrying a projecting contact member 107 which is adapted to engage spring contact clips 108 when the graduating stem is moved out by the triple valve piston upon an emergency application of the brakes. The contact clips 108 are connected to a conducting member 109 which passes through a suitable insulating block 110 and is connected in turn to a train wire 111 leading to one terminal of an electro-magnet 112. The electro-magnet 112 is preferably carried by the cap 105 and is adapted to operate a pair of oppositely seating check valves 113 and 114. The check valve 113 controls communication from a passage 115 leading to the triple piston chamber to atmospheric ports 116 and the check valve 114 controls communication from the train pipe passage 104 to passage 115. The other terminal of the magnet 112 is connected to a train wire 117 which leads to a suitable source of current. Normally the magnet 112 is deënergized and spring 118 maintains the check valve 113 closed and the check valve 114 open so that fluid from the train pipe may be supplied to and released from the triple valve piston chamber through the passages 104 and 115. When a triple valve device is moved to emergency position by a sudden reduction in train pipe pressure, the triple piston 101 moves out and causes the contact member 107 to engage the clips 108. The wire 111 is thus grounded through the triple valve and a circuit is established from the source of current through the magnets 112 of all the triple valves in the train, causing the magnets to be energized and thereby the check valve 114 is shifted to close communication from the passage 115 to the passage 104 and the check valve 113 is opened, so that fluid under pressure is vented from the triple valve piston chamber. It will now be evident that all of the triple valves in the train equipped with this improvement are simultaneously operated upon movement of any one triple valve to emergency position to effect an emergency application of the brakes.

In Figs. 7 and 8 another modification is shown, in which the switch device is directly operated by the movement of the vent valve parts. While we have shown a vent valve device in this connection which is similar to that shown in Fig. 2, it will be evident that the switch device may be employed with various other forms of vent valves. As shown, the valve stem 41 of the vent valve device carries a projecting stem 118 adapted to extend up into a switch cap 119 and is provided at its outer extremity with a contact disk 120 secured to a block 121 of insulating material, the block 121 being movably mounted on the stem 118 and having a spring 122 tending to yieldingly hold the block in position, so as to permit of such relative movement as may be necessary to compensate for any difference in movement required to bring the contact disk 120 into engagement with the fixed contacts 123 as compared with the movement of the vent valve piston 32. As in the other forms of our invention one of the contacts 123 is connected to a source of current and the other to ground. In connection with the arrangement shown in Fig. 7, a construction for venting air from the triple valve piston chamber may be employed similar to that shown in Fig. 6, but preferably we provide a somewhat different arrangement such as that shown in Fig. 8 in which a check valve 124 is provided which is adapted to be operated by an electro-magnet similar to the electro-magnet 112. The check valve 124 controls communication from the passage 125 opening into the triple valve piston chamber 126 to an atmospheric exhaust port 127. A check valve 128 having a small port 129 therein controls communication from the train pipe passage 104 to the passage 125. The check valve 128 is for the purpose of substantially cutting off communication from the train pipe to the triple valve piston chamber, so that upon operation of the vent valve, only fluid from the triple valve piston chamber is vented to the atmosphere, the small port 129 being provided to permit of supplying air from the train pipe to the triple valve piston chamber.

In operation, it will now be clear that upon closing the circuit of the electro-magnets governing the valves 124 by the operation of a switch 120, the vent valves 124 are opened and fluid under pressure is vented from the triple valve chamber of each triple valve, thereby causing a simultaneous application of the brakes throughout the train.

It will be evident that in the various forms of our invention the vent valves throughout the train are simultaneously operated by the action of an electric switch upon an emergency application of the brakes or a sudden reduction in train pipe pressure.

Having now described our invention, what we claim as new and desire to secure by Letters Patent, is:—

1. In a fluid pressure brake, the combination with a valve device operated by a reduction in fluid pressure for effecting an application of the brakes, a pneumatically operated vent valve mechanism for effecting a reduction in fluid pressure on said valve device, electrically controlled means also instrumental in effecting a reduction in fluid pressure on said valve device, and an electric switch device governed by said vent valve mechanism for controlling the circuit of said electrically controlled means.

2. In a fluid pressure brake, the combination with a train pipe and a triple valve operated by a reduction in train pipe pressure for applying the brakes, of a vent valve mechanism operated by a sudden reduction in train pipe pressure for opening a vent to the train pipe, electrically controlled means for effecting a reduction in fluid pressure on the triple valve to operate the same, and an electric switch operated by said vent valve mechanism for controlling the circuit of said electrically controlled means.

3. The combination with an automatic valve device operating upon a reduction in train pipe pressure for effecting an application of the brakes, of a vent valve mechanism adapted to locally vent the train pipe, electrically controlled means for effecting a direct reduction in fluid pressure on said valve device, and an electric switch device governed by said vent valve mechanism for controlling the electric circuit of said electrically controlled means.

4. In a fluid pressure brake, the combination with a brake cylinder, train pipe, and valve means for locally venting the train pipe, of electrically controlled means for effecting the operation of said valve means, and an electric switch device directly operated by said valve means for controlling the circuit of said electrically controlled means.

5. In a fluid pressure brake, the combination with a brake cylinder, train pipe, and valve means for locally venting the train pipe, of electrically controlled means for effecting the operation of said valve means, and an electric switch device mechanically connected to said valve means for controlling the circuit of said electrically controlled means.

6. In a fluid pressure brake, the combination with a train pipe, of a plurality of brake equipments connected to the train pipe, each comprising a triple valve, brake cylinder, valve means for venting fluid from the triple valve piston, electrically controlled means for operating said valve means, and a switch for controlling the electric circuit of the electrically controlled means, said switch being adapted to be operated upon a sudden reduction in train pipe pressure.

In testimony whereof we have hereunto set our hands.

EDWARD H. DEWSON.
WALTER V. TURNER.

Witnesses:
Wm. M. Cody,
A. M. Clements.

Copies of this patent may be obtained for five cents each, by addressing the "Commissioner of Patents, Washington, D. C."